United States Patent [19]
Nara

[11] Patent Number: 6,009,544
[45] Date of Patent: Dec. 28, 1999

[54] DEINTERLEAVER

[75] Inventor: Yoshikazu Nara, Yokohama, Japan

[73] Assignee: Matsushita Electric Industrial Co., Ltd., Osaka, Japan

[21] Appl. No.: 09/060,778

[22] Filed: Apr. 16, 1998

[30] Foreign Application Priority Data

Apr. 23, 1997  [JP]  Japan .................................. 9-118662

[51] Int. Cl.⁶ .................................................. G06F 11/00
[52] U.S. Cl. ........................................ 714/701; 711/200
[58] Field of Search .................................. 714/702, 701; 711/200, 201, 220, 218, 127, 157; 364/964.33, 966.3, 246.4

[56] References Cited

U.S. PATENT DOCUMENTS 4,901,319  2/1990  Ross ......................................... 714/788
5,572,532  11/1996  Fimoff et al. ........................... 714/702

FOREIGN PATENT DOCUMENTS 8-221972  8/1996  Japan .
8-237147  9/1996  Japan .

Primary Examiner—Trinh L. Tu
Attorney, Agent, or Firm—Venable; Robert J. Frank; Allen Wood

[57] ABSTRACT

A deinterleaver includes a first storage unit for storing data an order of which is rearranged from a correct order to a random order, a data latching unit for temporarily holding output data of the first storage unit, a second storage unit for storing output data of the data latching unit, and an addressing unit for generating a read addressing signal which is outputted to the first storage unit, and a write addressing signal which id outputted to the second storage unit. The addressing unit includes a counting unit for counting a clock to generate the read addressing signal, and an arithmetic unit for generating the write addressing signal for rearranging to the correct order using the read addressing signal outputted from the counting unit.

8 Claims, 4 Drawing Sheets

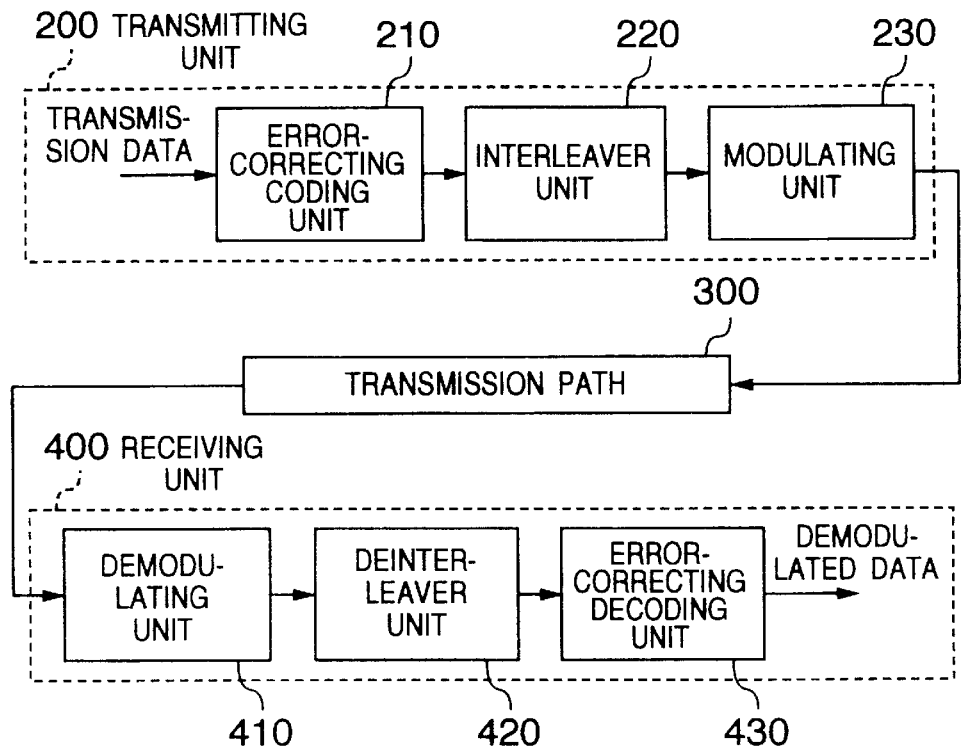

DEINTERLEAVER

BACKGROUND OF THE INVENTION

1. Field of the Invention

The present invention relates to a deinterleaver for deinterleaving an interleaved data sequence, and in particular to a deinterleaver required for a code division multiple access (CDMA) terminal unit operating in conformity with the U.S. IS-95 Standard.

2. Description of the Related Art

In communication systems, there possibly occur consecutive errors in communication data depending on environments of data transmission paths and the like to resultantly invalidate the advantageous effect of the random-error-correcting coding. In such a situation, there are commonly achieved the following operations. Namely, to convert data errors successively occurred during transmission into random data errors, the order of transmission data to be transmitted is rearranged to a predetermined random order and then the transmission data are sent from a transmitter. In a receiver, the order of reception data is rearranged in the correct order or the original order. An apparatus to rearrange the order of the transmission data to the predetermined random order is called an interleaver, and an apparatus to rearrange the order of the reception data to the correct order is called a deinterleaver.

A conventional deinterleaver includes, as shown in FIG. 1, a first storage unit 110, a data latching unit 120, a second storage unit 130, and an addressing unit 140 including a binary counting unit 141 and a third storage unit 142.

Reception data are sequentially stored in the first storage unit 110 beginning at address "0". The binary counting unit 141 of the addressing unit 140 counts from the initial count value "0" to the number of the reception data stored in the first storage unit 110, and produces an output signal corresponding to the count value. The output signal is outputted to the first and third storage units 140 and 142 as a read addressing signal. Therefore, the reception data stored in the first storage unit 110 are sequentially read out therefrom in response to the read addressing signal from the binary counting unit 141 beginning at address "0". The reception data read out from the first storage unit 110 are temporarily held in the data latching unit 120.

In the third storage unit 142 of the addressing unit 140, the numbers representing the correct order of the reception data are stored beginning at address "0". The numbers are sequentially read out from the third storage unit 142 in response to the read addressing signal from the binary counting unit 141 beginning at the number stored at address "0". The number read out from the third storage unit 142 is outputted to the second storage unit 130 as a write addressing signal.

In the second storage unit 130, the reception data temporarily held in the data latching unit 120 are stored at an address specified by the write addressing signal from the third storage unit 142. Resultantly, the reception data are sequentially stored in the second storage unit 130 in the correct order beginning at address "0".

That is, in the deinterleaver shown in FIG. 1, the reception data are sequentially read out from the first storage unit 110 in the order of reception. When the reception data read out from the first storage unit 110 are written to the second storage unit 130, the write address of the second storage unit 130 is modified. Thereby, the order of the reception data is rearranged to the order before the interleaving operation.

However, since the conventional deinterleaver requires a memory having a relatively large storage capacity as the third storage unit 142 which is used for storing the numbers representing the correct order of the reception data as the write address information of the second storage unit 130, the hardware area and power consumption are disadvantageously increased. Consequently, such a deinterleaver cannot be suitably installed in a reception apparatus such as a mobile communication terminal equipment of which the size and power consumption are required to be minimized.

SUMMARY OF THE INVENTION

It is therefore an object of the present invention to provide a deinterleaver of which the size and power consumption can be reduced.

To solve the problem above in accordance with the present invention, there is provided a first deinterleaver comprising: first storage means for storing therein data an order of which is rearranged from a correct order to a random order; data latching means for temporarily holding therein output data of the first storage means; second storage means for storing therein output data of the data latching means; and addressing means for generating a read addressing signal which is outputted to the first storage means, and a write addressing signal which is outputted to the second storage means, wherein the addressing means includes counting means for counting a clock to generate the read addressing signal; and arithmetic means for generating the write addressing signal for rearranging the order of the data from the random order to the correct order using the read addressing signal outputted from the counting means.

Moreover, in accordance with the present invention, there is provided a second deinterleaver comprising: first storage means for storing therein data an order of which is rearranged from a correct order to a random order; data latching means for temporarily holding therein output data of the first storage means; second storage means for storing therein output data of the data latching means; and addressing means for generating a read addressing signal which is outputted to the first storage means, and a write addressing signal which is outputted to the second storage means, wherein the addressing means includes counting means for counting a clock to generate the write addressing signal; and arithmetic means for generating the read addressing signal for rearranging the order of the data from the random order to the correct order using the write addressing signal outputted from the counting means.

BRIEF DESCRIPTION OF THE DRAWINGS

The objects and features of the present invention will become more apparent from the consideration of the following detailed description taken in conjunction with the accompanying drawings in which:

FIG. 4 is a block diagram showing a configuration example of a communication system including a receiving apparatus which has a deinterleaver of the present invention; and FIG. 5 is a schematic diagram showing a portion of a data sequence after being interleaved of a paging channel of a down link of the IS-95 Standard or a forward traffic channel thereof.

DESCRIPTION OF THE PREFERRED EMBODIMENTS

Referring now to FIGS. 2 to 5, description will be given of an embodiment of the present invention by using as an example a deinterleaver for use with a paging channel for a down link of a CDMA terminal facility conforming to the U.S. IS-95 Standard and/or a forward-traffic channel thereof.

First Embodiment of the Invention

Figure 1:
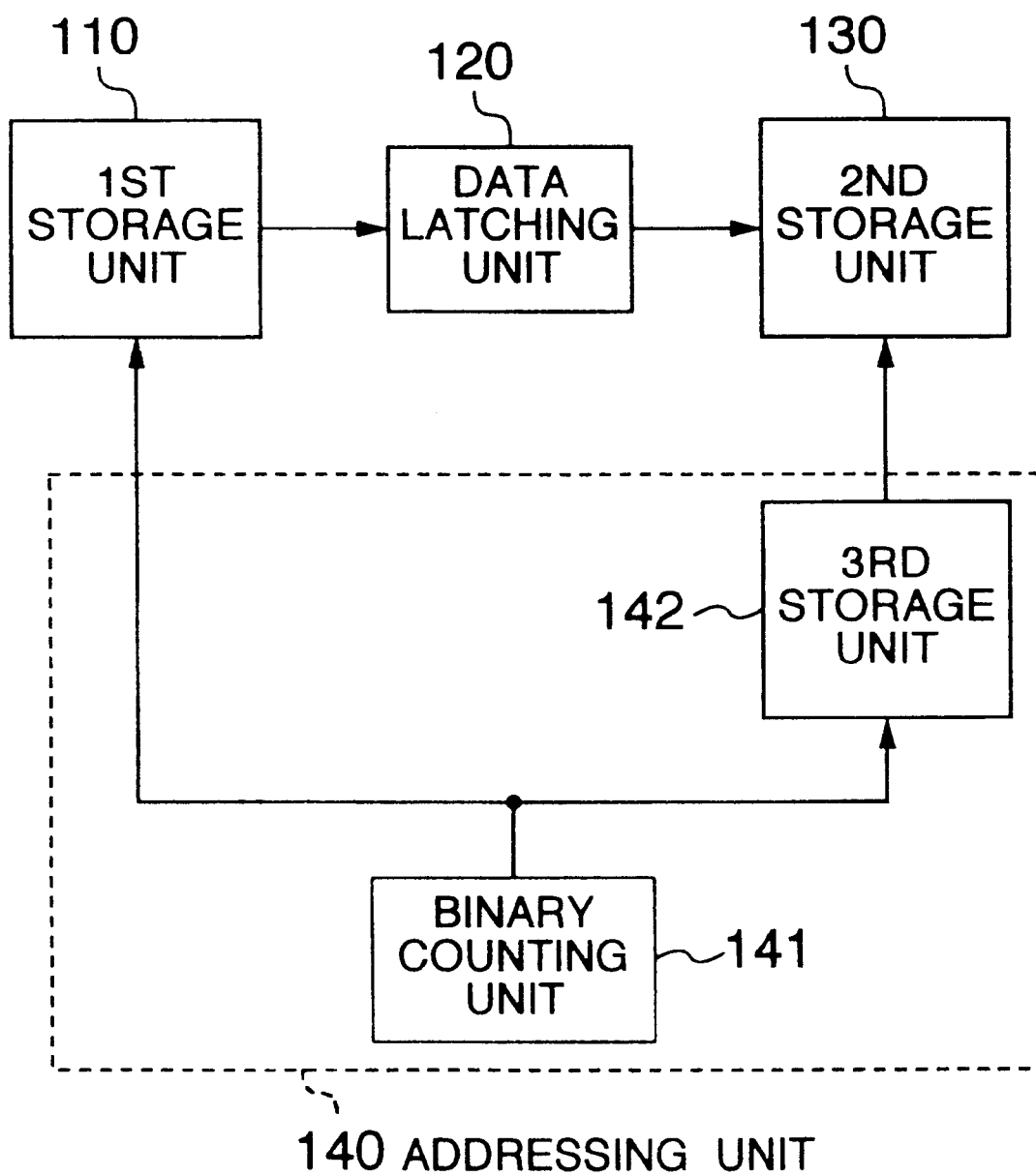
FIG. 1 is a block diagram showing a configuration of a conventional deinterleaver.
Figure 2:
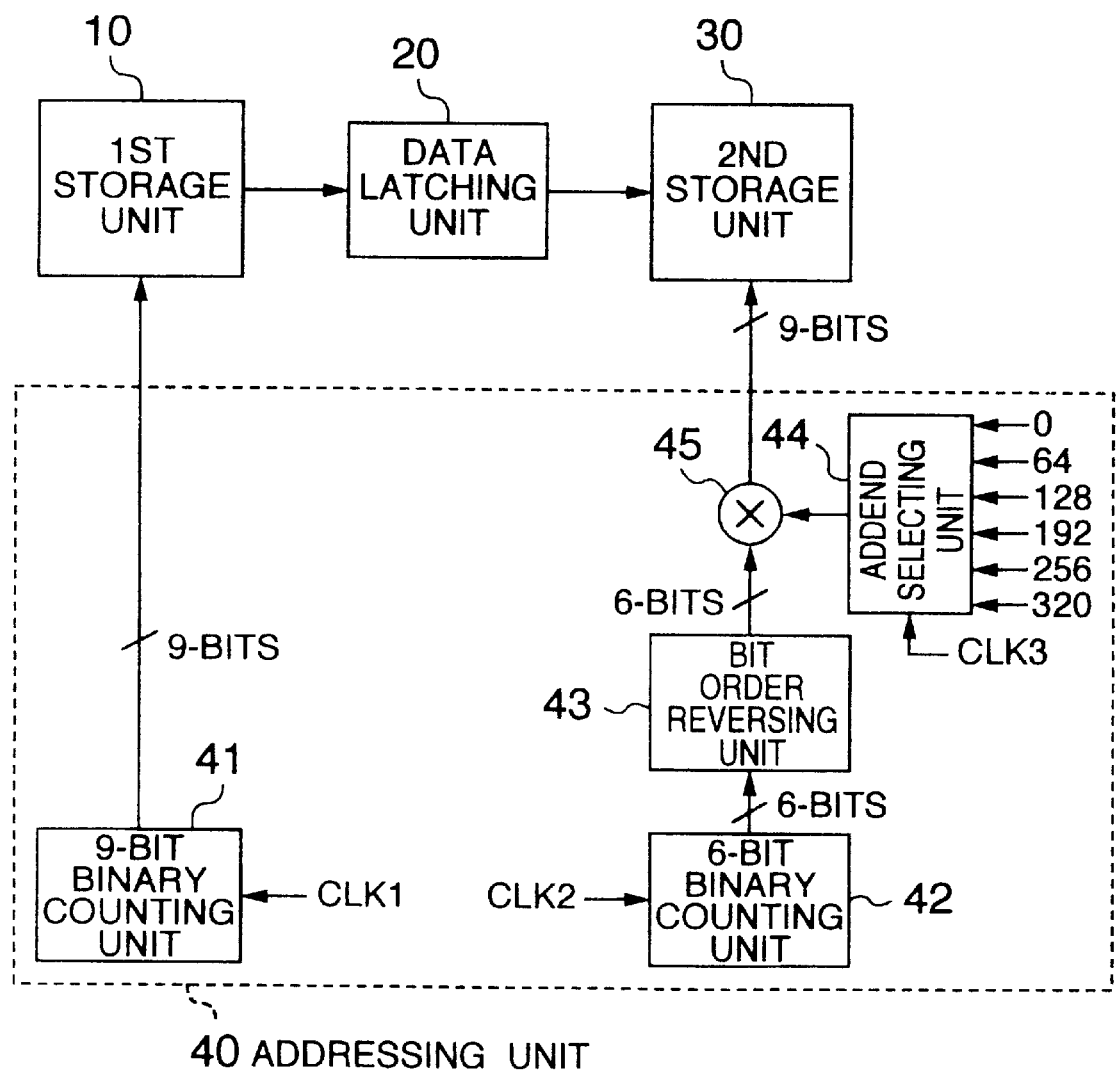
FIG. 2 is a block diagram showing structure of a deinterleaver according to a first embodiment of the present invention.

An deinterleaver according to a first embodiment of the present invention includes, as shown in FIG. 2, a first storage unit 10, a data latching unit 20, a second storage unit 30, and an addressing unit 40. In the structure, the addressing unit 40 includes a 9-bit binary counting unit 41, a 6-bit binary counting unit 42, a bit order reversing unit 43, an addend selecting unit 44, and an adder 45.

Reception data are sequentially stored in the first storage unit 10 beginning at address "0 (decimal)". The 9-bit binary counting unit 41 of the addressing unit 40 counts from "0 (decimal)" to "383 (decimal)", so that the count value is sequentially outputted to the first storage unit 10 as a read addressing signal. Accordingly, the reception data stored in the first storage unit 10 are sequentially read out therefrom beginning at address "0 (decimal)" in response to the read addressing signal from the 9-bit binary counting unit 41. The reception data read out from the first storage unit 10 are temporarily held in the data latching unit 20.

The 6-bit binary counting unit 42 of the addressing unit 40 is driven with a clock signal CLK2. The frequency of the clock signal CLK2 is one sixth that of a clock signal CLK1 which is used to drive the 9-bit binary counting unit 41. The 6-bit binary counting unit 42 counts from "0 (decimal)" to "63 (decimal)", and the obtained count value is sequentially outputted to the bit order reversing unit 43. The bit order reversing unit 43 rearranges a bit order of the count value from the 6-bit binary counting unit 42 to an inverted bit order. For example, when the count value from the 6-bit binary counting unit 42 is "101000", the bit order reversing unit 43 produces an output data of "000101".

The addend selecting unit 44 is driven with a clock signal CLK3 having a frequency equal to that of the clock signal CLK1 utilized to drive the 9-bi binary counting unit 41. The addend selecting unit 44 sequentially selects six addends (i.e. 0, 64, 128, 192, 256 and 320) in synchronism with the clock signal CLK3. For example, the addend selecting unit 44 includes a 3-bit sextanary counter, so that when the count values are "0 (decimal)", "1 (decimal)", "2 (decimal)", "3 (decimal)", "4 (decimal)" and "5 (decimal)", addends "0 (decimal)", "64 (decimal)", "128 (decimal)", "192 (decimal) ", "256 (decimal)" and "320 (decimal)" are selected, respectively. The operation is thereafter repeatedly executed in a similar manner. In this connection, the addend selecting unit 44 may also be implemented with a counter and a selector.

The adder 45 adds an output signal of the bit order reversing unit 43 and an output signal of the addend selecting unit 44, and the resultant signal is outputted to the second storage unit 30 as a write addressing signal. The reception data temporarily held in the data latching unit 20 are stored in the second storage unit 30 at an address designated by the write addressing signal from the adder 45.

Next, description will be given of operation of the deinterleaver according to this embodiment in an example in which the interleaved reception data as shown in FIG. 5 are inputted. In FIG. 5, a read address indicates a read address of the first storage unit 10, and each of reception data denotes a portion of a data sequence after being interleaved on a paging channel for a down link of the U.S. IS-95 Standard or on a forward traffic channel thereof. In this regard, for example, reception data D0 stored in the first storage unit 10 at read address "0 (decimal)" designates data the data position of which is the first before the interleaving operation, and reception data D64 stored in the first storage unit 10 at read address "1 (decimal)" designates data the data position of which is the 64-th before the interleaving operation.

When an initial count value "000000000" (decimal "0") of the 9-bit binary counting unit 41 is outputted from the 9-bit binary counting unit 41 to the first storage unit 10 as the read addressing signal, the reception data D0 stored at read address "0 (decimal)" of the first storage unit 10 are read out therefrom to be temporarily held in the data latching unit 20. Furthermore, an initial count value "000000" (decimal "0") of the 6-bit counting unit 42 is outputted to the bit order reversing unit 43, and then the bit order thereof is reversed. As a result, "000000" (decimal "0") is outputted from the bit order reversing unit 43 to the adder 45. In this situation, since the addend selecting unit 44 selects addend "0 (decimal)" ("000000000"), the addition result "000000000" (decimal "0") is outputted from the adder 45 to the second storage unit 30 as the write addressing signal. Accordingly, the reception data D0 temporarily held in the data latching unit 20 are stored in the second storage unit 30 at address "0 (decimal)" which corresponds to the data position of the reception data D0 before the interleaving operation.

When the count value "000000001" (decimal "1") is outputted from the 9-bit binary counting unit 41 to the first storage unit 10 as the read addressing signal, the reception data D64 stored at read address "1 (decimal)" are read out from the first storage unit 10 to be temporarily held in the data latching unit 20. On this occasion, since the 6-bit binary counting unit 42 continuously outputs "000000000" (decimal "0") to the bit order reversing unit 43, "000000000" (decimal "0") is outputted from the bit order reversing unit 43 to the adder 45. In addition, the addend selecting unit 44 selects addend "64 (decimal) ("001000000") to output the addend to the adder 45. Resultantly, the addition result "001000000" (decimal "64") is outputted from the adder 45 to the second storage unit 30 as the write addressing signal. In response thereto, the reception data D64 temporarily held in the data latching unit 20 are stored in the second storage unit 30 at address "64 (decimal)" which corresponds to the data position of the reception data D64 before the interleaving operation.

After this point, the operation is repeatedly carried out in a similar fashion, so that the reception data are stored in the second storage unit 30 at addresses which correspond to positions of the reception data before the interleaving operation, as shown in Table 1.

TABLE 1

| Output from 9-bit binary counting unit 41 (read address of 1st storage unit 10) | Interleaved data read out | Output from 6-bit binary counting unit 42 | Output from bit order reversing unit 43 | Output (decimal) From addend Selecting unit 44 | Output decimal) from adder 45 (write address of 2nd storage unit 30) |
|---|---|---|---|---|---|
| "000000000" | D0 | "000000" | "000000" | 0 | 0 |
| "000000001" | D64 | "000000" | "000000" | 64 | 64 |
| "000000010" | D128 | "000000" | "000000" | 128 | 128 |
| "000000011" | D192 | "000000" | "000000" | 192 | 192 |
| "000000100" | D256 | "000000" | "000000" | 256 | 256 |
| "000000101" | D320 | "000000" | "000000" | 320 | 320 |
| "000000110" | D32 | "000001" | "100000" | 0 | 32 |
| "000000111" | D96 | "000001" | "100000" | 64 | 96 |
| "000001000" | D160 | "000001" | "100000 | 128 | 160 |
| "000001001" | D224 | "000001" | "100000" | 192 | 224 |
| "000001010" | D288 | "000001" | "100000" | 256 | 288 |
| "000001011" | D352 | "000001" | "100000" | 320 | 352 |
| "000001100" | D16 | "000010" | "010000" | 0 | 16 |
| "000001101" | D80 | "000010" | "010000" | 64 | 80 |
| "000001110" | D144 | "000010" | "010000" | 128 | 144 |
| "000001111" | D208 | "000010" | "010000" | 192 | 208 |
| "000010000" | D272 | "000010" | "010000" | 256 | 272 |
| "000010001" | D336 | "000010" | "010000" | 320 | 336 |
| "000010010" | D48 | "000011" | "110000" | 0 | 48 |
| "000010011" | D112 | "000011" | "110000" | 64 | 112 |
| "000010100" | D176 | "000011" | "110000" | 128 | 176 |
| "000010101" | D240 | "000011" | "110000" | 192 | 240 |
| "000010110" | D304 | "000011" | "110000" | 256 | 304 |
| "000010111" | D368 | "000011" | "110000" | 320 | 368 |

For example, reception data D32, D144 and D368 stored at read addresses "6 (decimal)", "14 (decimal)" and "23 (decimal)" in the first storage unit 10 are stored in the second storage unit 30 at addresses which correspond to the data positions of the reception data D32, D144 and D368 before the interleaving operation, as follows (reference is to be made to 7-th, 15-th and last rows of Table 1).

When count value "000000110" (decimal "6") is outputted from the 9-bit binary counting unit 41 to the first storage unit 10 as the read addressing signal, the reception data D32 stored at read address "6 (decimal)" are read out from the first storage unit 10 to be temporarily held in the data latching unit 20. Since the count value of the 6-bit binary counting unit 42 is "000001" (decimal "1") in this case, "100000" (decimal "32") is outputted from the bit order reversing unit 43 to the adder 45. On the other hand, the addend "0 decimal)" ("000000000") is selected to be outputted from the addend selecting unit 44 to the adder 45. Resultantly, the addition result "000100000" (decimal "32") is outputted from the adder 45 to the second storage unit 30. Accordingly, the reception data D32 temporarily held in the data latching unit 20 are stored in the second storage unit 30 at address "32 (decimal)" which corresponds to the data position of the reception data D32 before the interleaving operation.

When count value "000001110" (decimal "14") is outputted from the 9-bit binary counting unit 41 to the first storage unit 10 as the read addressing signal, the reception data D144 stored at read address "14 (decimal)" are read out from the first storage unit 10 to be temporarily held in the data latching unit 20. On this occasion, since the count value of the 6-bit binary counting unit 42 is "00001" (decimal "2"), "010000" (decimal "16") is outputted from the bit order reversing unit 43 to the adder 45. On the other hand, the addend "128 (decimal)" ("010000000") is selected to be outputted from the addend selecting unit 44 to the adder 45. As a result, the addition result "0100010000" (decimal "144") is outputted from the adder 45 to the second storage unit 30. The reception data D144 temporarily held in the data latching unit 20 are accordingly stored in the second storage unit 30 at address "144 (decimal)" which corresponds to the data position of the reception data D144 before the interleaving operation.

For the reception data D368, when count value "00010111" (decimal "23") is outputted from the 9-bit binary counting unit 41 to the first storage unit 10 as the read addressing signal, the reception data D368 stored at read address "23 (decimal)" are read out from the first storage unit 10 to be temporarily held in the data latching unit 20. Since the count value of the 6-bit binary counting unit 42 is "000011" (decimal "3") in this situation, "110000" (decimal "48") is outputted from the bit order reversing unit 43 to the adder 45. On the other hand, the addend "320 (decimal)" ("101000000") is selected to be outputted from the addend selecting unit 44 to the adder 45. Resultantly, the addition result "101000011" (decimal "368") is outputted from the adder 45 to the second storage unit 30. Accordingly, the reception data D368 temporarily held in the data latching unit 20 are stored in the second storage unit 30 at address "368 (decimal)" which corresponds to the data position of the data latching unit 20 before the interleaving operation.

As described above, in the deinterleaver of this embodiment, since the addressing unit 40 can be configured with a counter and an arithmetic circuit, the memory for address modification table for the deinterleaving operation can be dispensed with and the circuit system can be advantageously configured in a small-sized structure for minimized power consumption.

Second Embodiment of the Invention

A deinterleaver according to a second embodiment of the present invention includes a first storage unit 50, a data latching unit 60, a second storage unit 70, and an addressing unit 80. In this connection, the addressing unit 80 includes a 9-bit binary counting unit 81, a bit order reversing unit 82, a multiplier 83, a divider 84, and an adder 85.

Reception data are sequentially stored in the first storage unit 50 beginning at address "0 (decimal)". The 9-bit binary counting unit 81 of the addressing unit 80 counts from "0 (decimal)" to "383 (decimal)". The bit order reversing unit 82 rearranges a bit order of six low-order bits of a count value of the 9-bit binary counting unit 81 to an inverted order. For example, the count value of the 9-bit binary counting unit 81 is "100101000" (decimal "296"), "000101" (decimal "5") is outputted from the bit order reversing unit 82. The multiplier 83 multiplies an output signal of the bit order reversing unit 82 by a multiplication factor "6 (decimal)". Additionally, the divider 84 divides the count value of the 9-bit binary counting unit 81 by a fixed value "64 (decimal)". Incidentally, it is also possible to extract only three high-order bits of the count value of the 9-bit binary counting unit 81. The adder 85 adds the output signal of the multiplier 83 to the output signal of the divider 84, and then the addition result is outputted to the first storage unit 50 as a read addressing signal. As a result, the reception data stored in the first storage unit 50 are sequentially read out therefrom in response to the read addressing signal from the adder 85. The reception data read out from the first storage unit 50 are temporarily held in the data latching unit 60.

The count value of the 9-bit binary counting unit 81 of the addressing unit 80 is consecutively outputted therefrom to the second storage unit 70 as a write addressing signal. As s result, the reception data temporarily held in the data latching unit 60 are sequentially stored in the second storage unit 70 in response to the write addressing signal from the 9-bit binary counting unit 81.

Next, operation of the deinterleaver according to the second embodiment will be described in relation to an example in which the interleaved reception data shown in FIG. 5 are inputted.

In the addressing unit 80, the initial count value "000000000" (decimal "0") of the 9-bit binary counting unit 81 is outputted from the 9-bit binary counting unit 81 to the bit order reversing unit 82. In the bit order reversing unit 82, only six low-order bits are extracted from the count value, and then the bit order thereof is reversed. As a result, "000000" (decimal "0") is outputted from the bit order reversing unit 82 to the multiplier 83. In the multiplier 83, "000000" (decimal "0") is multiplied by the multiplication factor "6 (decimal)" to output the multiplication result "000000000" (decimal "0") to the adder 85. On the other hand, in the divider 81, the initial count value "000000000" (decimal "0") of the 9-bit binary counting unit 81 is divided by the fixed value "64 (decimal)" to output the division result "000" (decimal "0") to the adder 85. In the adder 85, the multiplication result "000000000" (decimal "0") is added to the division result "000" (decimal "0"), so that the addition result "000000000" (decimal "0") is outputted to the first storage unit 50 as the read addressing signal. Resultantly, the reception data D0 stored in the first storage unit 50 at read address "0 (decimal)" are read out therefrom (see FIG. 5) to be temporarily held in the data latching unit 60. In this situation, since the initial count value "000000000" (decimal "0") of the 9-bit binary counting unit 81 is inputted to the second storage unit 70 as the write addressing signal, the reception data D0 temporarily held in the data latching unit 70 are stored in the second storage unit 70 at address "0 (decimal)" which corresponds to the data position of the reception data D0 before the interleaving operation.

Subsequently, the count value "000000001" (decimal "1") is outputted from the 9-bit binary counting unit 81 to the bit order reversing unit 82. In the bit order reversing unit 82, only six low-order bits are extracted from the count value, and then the bit order thereof is reversed. As a result, "100000" (decimal "32") is outputted from the bit order reversing unit 82 to the multiplier 83. In the multiplier 83, "100000" (decimal "32") is multiplied by the multiplication factor "6 (decimal)", and then the multiplication result "110000000" (decimal "192") is outputted to the adder 85. On the other hand, in the divider 81, the count value "000000001" (decimal "1") of the 9-bit binary counting unit 81 is divided by the fixed value "64 (decimal)", and then the division result "000" (decimal "0") is fed to the adder 85. In the adder 85, the multiplication result "110000000" (decimal "192") is added to the division result "000" (decimal "0"), so that the addition result "110000000" (decimal "192") is outputted to the first storage unit 50 as the read addressing signal. Responsively, the reception data D1 (not shown in FIG. 5) stored in the first storage unit 50 at read address "192 (decimal)" are read out therefrom to be temporarily held in the data latching unit 60. On the other hand, since the count value "000000001" (decimal "1") of the 9-bit binary counting unit 81 is inputted to the second storage unit 70 as the write addressing signal, the reception data D1 temporarily held in the data latching unit 70 are stored in the second storage unit 70 at address ∓1 (decimal)" which corresponds to the data position of the reception data D1 before the interleaving operation.

The operation above is repeatedly carried out thereafter in a similar manner, so that the reception data are stored in the second storage unit 70 at addresses which correspond to the data positions of the reception data before the interleaving operation.

TABLE 2

| Output from 9-bit binary counting unit 91 (write address of 2nd storage unit 70) | Output from bit order reversing unit 82 | Output (decimal) from multiplier 83 | Output (decimal) from divider 84 | Output (decimal) from adder 85 (read address of 1st storage unit 50) | Interleaved data read out |
|---|---|---|---|---|---|
| "000000000" | "000000" | 0 | 0 | 0 | D0 |
| "000000001" | "100000" | 192 | 0 | 192 | D1 |
| "000000010" | "010000" | 96 | 0 | 96 | D2 |
| "000000011" | "110000" | 288 | 0 | 288 | D3 |
| "000000100" | "001000" | 48 | 0 | 48 | D4 |
| "000000101" | "101000" | 240 | 0 | 240 | D5 |
| "000000110" | "011000" | 144 | 0 | 144 | D6 |
| "000000111" | "111000" | 336 | 0 | 336 | D7 |
| "000001000" | "000100" | 24 | 0 | 24 | D8 |
| "000001001" | "100100" | 216 | 0 | 216 | D9 |
| "000001010" | "010100" | 120 | 0 | 120 | D10 |
| "000001011" | "110100" | 312 | 0 | 312 | D11 |
| "000001100" | "001100" | 72 | 0 | 72 | D12 |
| "000001101" | "101100" | 264 | 0 | 264 | D13 |
| "000001110" | "011100" | 168 | 0 | 168 | D14 |

TABLE 2-continued

| Output from 9-bit binary counting unit 91 (write address of 2nd storage unit 70) | Output from bit order reversing unit 82 | Output (decimal) from multiplier 83 | Output (decimal) from divider 84 | Output (decimal) from adder 85 (read address of 1st storage unit 50) | Interleaved data read out |
|---|---|---|---|---|---|
| "000001111" | "111100" | 360 | 0 | 360 | D15 |
| "000010000" | "000010" | 12 | 0 | 12 | D16 |
| "000010001" | "100010" | 204 | 0 | 204 | D17 |
| "000010010" | "010010" | 108 | 0 | 108 | D18 |
| "000010011" | "110010" | 300 | 0 | 300 | D19 |
| "000010100" | "001010" | 60 | 0 | 60 | D20 |

For example, the reception data D16 and D8 stored at read addresses "12 (decimal)" and "24 (decimal)" in the first storage unit 50 are stored in the second storage unit 30 at addresses which correspond to the data positions of the reception data D16 and D8 before the interleaving operation, as follows (see the 17-th and ninth rows of Table 2).

For the reception data D16, the count value of "000010000" (decimal "16") is outputted from the 9-bit binary counting unit 81 to the bit order reversing unit 82. In the bit order reversing unit 82, only six low-order bits are extracted from the count value, and then the bit order thereof is reversed. As a result, "000010" (decimal "2") is outputted from the bit order reversing unit 82 to the multiplier 83. In the multiplier 83, "000010" (decimal "2") is multiplied by the multiplication factor "6 (decimal)", and then the multiplication result "000001100" (decimal "12") is outputted to the adder 85. On the other hand, in the divider 81, the count value "000010000" (decimal "16") of the 9-bit binary counting unit 81 is divided by the fixed value "64 (decimal)", and then the division result "000" (decimal "0") is outputted to the adder 85. In the adder 85, the multiplication result "000001100" (decimal "12") is added to the division result "000" (decimal "0"), so that the addition result "000001100" (decimal "12") is outputted to the first storage 50 as the read addressing signal. As a result, the reception data D16 (see FIG. 5) stored in the first storage unit 50 at read address "12 (decimal)" are read out therefrom to be temporarily held in the data latching unit 60. On the other hand, since the count value "000010000" (decimal "16") from the 9-bit binary counting unit 81 is inputted to the second storage unit 70 as the write addressing signal, the reception data D16 temporarily held in the data latching unit 70 are stored in the second storage unit 70 at address "16 (decimal)" which corresponds to the data position of the reception data D16 before the interleaving operation.

For the reception data D8, the count value "000001000" (decimal "8") is outputted from the 9-bit binary counting unit 81 to the bit order reversing unit 82. In the bit order reversing unit 82, only six low-order bits are extracted from the count value, and then the bit order thereof is reversed. Resultantly, "000100" (decimal "4") is outputted from the bit order reversing unit 82 to the multiplier 83. In the multiplier 83, "000100" (decimal "4") is multiplied by the multiplication factor "6 (decimal)", and then the multiplication result "000011000" (decimal "24") is outputted to the adder 85. On the other hand, in the divider 81, the count value "000001000" (decimal "8") of the 9-bit binary counting unit 81 is divided by the fixed value "64 (decimal)", and then the division result "000" (decimal "0") is outputted to the adder 85. In the adder 85, the multiplication result "000011000" (decimal "24") is added to the division result "000" (decimal "0"), so that the addition result "000011000" (decimal "24") is outputted to the first storage unit 50 as the read addressing signal. In response thereto, the reception data D8 (see FIG. 5) stored in the first storage unit 50 at read address "24 (decimal)" are read out therefrom to be temporarily held in the data latching unit 60. On the other hand, since the count value "000001000" (decimal "8") of the 9-bit binary counting unit 81 is inputted to the second storage unit 70 as the write addressing signal, the reception data D8 temporarily held in the data latching unit 70 are stored in the second storage unit 70 at address "8 (decimal)" which corresponds to the data position of the reception data D8 before the interleaving operation.

To explain functions of the divider 84, description will now be given of operation of the deinterleaver with respect to the reception data D320 and D352 (not shown in Table 2) stored in the first storage unit 50 at read addresses "5 (decimal)" and "11 (decimal)".

The count value "101100000" (decimal "352") is delivered from the 9-bit binary counting unit 81 to the bit order reversing unit 82. In the bit order reversing unit 82, only six low-order bits are extracted from the count value, and then the bit order thereof is reversed. As a result, "000001" (decimal "1") is outputted from the bit order reversing unit 82 to the multiplier 83. In the multiplier 83, "000001" (decimal "1") is multiplied by the multiplication factor "6 (decimal)" to output the multiplication result "000000110" (decimal "6") to the adder 85. On the other hand, in the divider 81, the count value "101100000" (decimal "352") of the 9-bit binary counting unit 81 is divided by the fixed value "64", and then the division result "101" (decimal "5") is outputted to the adder 85. In the adder 85, the multiplication result "000000110" (decimal "6") is added to the division result "101" (decimal "5"), so that the addition result "000001011" (decimal "11") is outputted to the first storage unit 50 as the read addressing signal. Resultantly, the reception data D352 stored in the first storage unit 50 at read address "11 (decimal)" are read out therefrom (see FIG. 5) to be temporarily held in the data latching unit 60. In this situation, since the count value "101100000" (decimal "352") of the 9-bit binary counting unit 81 is inputted to the second storage unit 70 as the write addressing signal, the reception data D352 temporarily held in the data latching unit 70 are stored in the second storage unit 70 at address "352 (decimal)" which corresponds to the data position of the reception data D352 before the interleaving operation.

As above, in the deinterleaver according to the second embodiment of the present invention, since the addressing unit 80 can be configured with a counter and an arithmetic circuit, the memory for address modification table for the deinterleaving operation can be dispensed with. This makes it possible to construct the deinterleaver in a small-sized structure for minimized power consumption.

Embodiment of a Receiving Apparatus of the Invention

Figure 3:
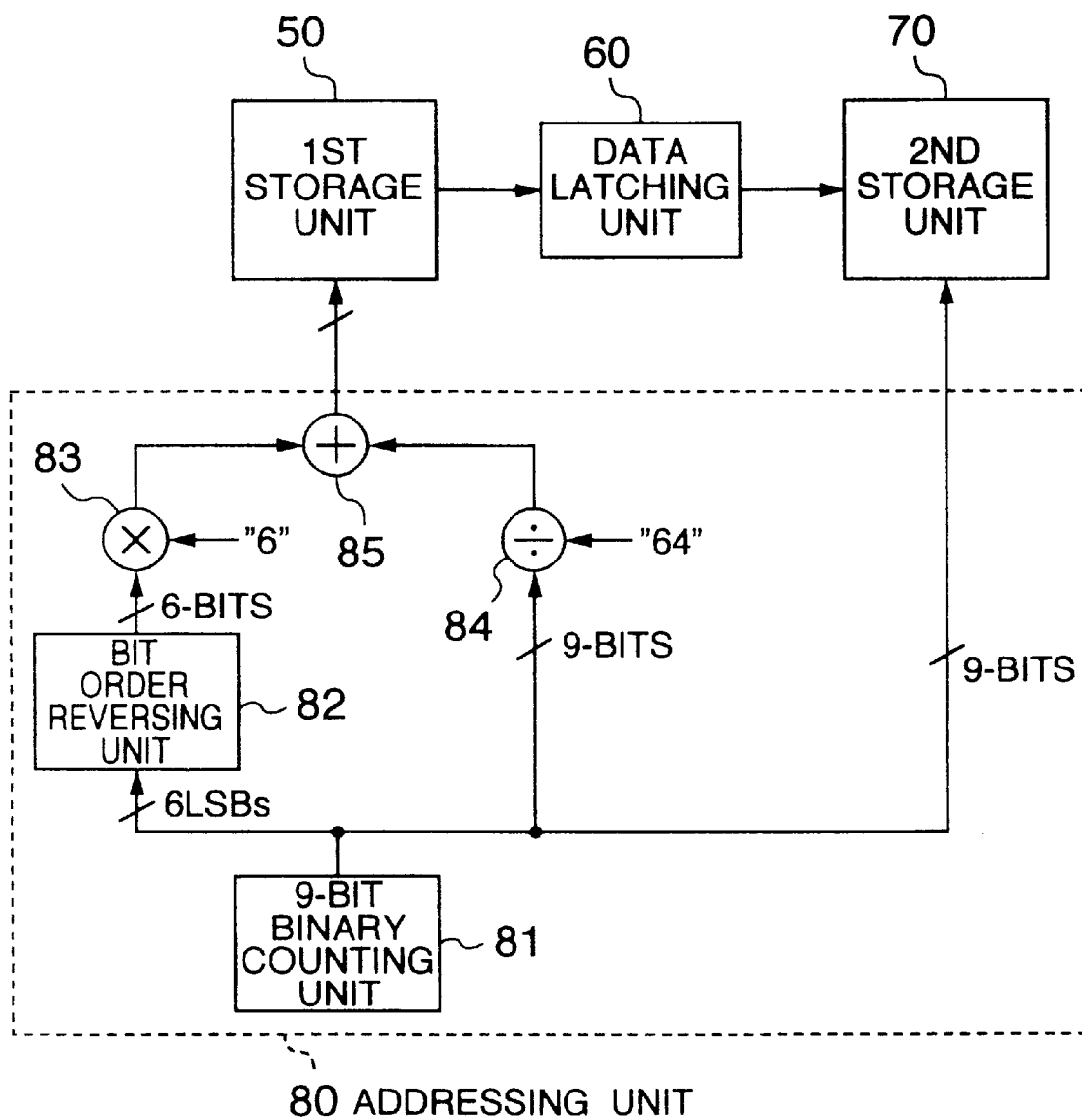
FIG. 3 is a block diagram showing constitution of a deinterleaver according to a second embodiment of the present invention.

As can be seen from FIG. 4, there is provided a receiving apparatus 400 having a deinterleaver according to the present invention which includes a demodulating unit 410, a deinterleaving unit 420 configured in substantially the same fashion as for the deinterleaver shown in FIG. 2 or 3, and an error-correcting decoding unit 430. The receiver 400 is connected via a transmission path 300 to a transmitting unit 200 which includes an error-correcting coding unit 210 to conduct an error-correcting coding for transmission data, an interleaving unit 220 to achieve an interleaving operation for the output signal of the error-correcting coding unit 210, and a modulating unit 230 to modulate the output signal of the interleaving unit 220 so as to transmit the modulated output signal.

In the receiving unit 400, the transmission signal transmitted via the transmission path 300 from the transmitter 200 is demodulated by the demodulating unit 410 to produce reception data. The reception data are deinterleaved as described above by the deinterleaving unit 420. As a result, the reception data are rearranged to the correct order, and then is outputted from the deinterleaving unit 420 to the error-correcting decoding unit 430 to be decoded therein. In response thereto, decoded data are outputted from the receiving apparatus 400.

In the deinterleaving unit 420 of the receiver 400, since the addressing unit can be configured with a counter and an arithmetic circuit (FIGS. 2 and 3), it is possible to construct the deinterleaving unit 420 in a small size for minimized power consumption.

Other Embodiments

The deinterleaver shown in FIG. 2 may possibly utilized as an interleaver in a transmitting apparatus as follows. Namely, the read addressing signal sent from the addressing unit 40 to the first storage unit 10 is used also as the write addressing signal for the first storage unit 10 and the read addressing signal for the second storage unit 30 is adopted also as the write addressing signal for the second storage unit 30, so that transmission data is outputted from the second storage unit 30 to the first storage unit 10 via the data latching unit 20 to be written in the first storage unit 10.

Similarly, the deinterleaver of FIG. 3 may also be used as an interleaver in a transmitting apparatus.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. A deinterleaver, comprising:
    first storage means for storing data an order of which is rearranged from a correct order to a random order;
    data latching means for temporarily holding output data of said first storage means;
    second storage means for storing output data of said data latching means; and
    addressing means for generating a read addressing signal which is outputted to said first storage means, and a write addressing signal which is outputted to said second storage means, wherein
    said addressing means includes:
        counting means for counting a clock to generate said read addressing signal; and
        arithmetic means for generating said write addressing signal to rearrange the order of said data from said random order to said correct order using said read addressing signal outputted from said counting means.

2. A deinterleaver according to claim 1, wherein
    said counting means includes m-bit binary counting means for counting said clock to generate said read addressing signal, wherein m is an integer; and
    the arithmetic means includes:
        n-bit binary counting means for counting another clock, which has a frequency less than that of said clock, to output a count value, wherein n is an integer less than m;
        bit order reversing means for reversing a bit order of said count value outputted from said n-bit binary counting means;
        addend selecting means for sequentially selecting a plurality of addends in synchronism with said clock; and
        adder means for adding an output signal of said bit order reversing means to an output signal of said addend selecting means.

3. A deinterleaver in accordance with claim 2, wherein:
    said m-bit binary counting means includes a 9-bit binary counter;
    said n-bit binary counting means includes a 6-bit binary counter;
    said another clock has a frequency which is one sixth that of said clock; and
    said addend selecting means sequentially selects addends of 0, 64, 128, 192, 256 and 320 in synchronism with said clock.

4. A receiving apparatus, comprising a deinterleaver according to claim 1, 2 or 3 for receiving data, which are transmitted from a transmitting apparatus and an order of which is rearranged from a correct order to a random order, to rearrange said random order to said correct order.

5. A deinterleaver, comprising:
    first storage means for storing data an order of which is rearranged from a correct order to a random order;
    data latching means for temporarily holding output data of said first storage means;
    second storage means for storing output data of said data latching means; and
    addressing means for generating a read addressing signal which is outputted to said first storage means, and a write addressing signal which is outputted to said second storage means, wherein said addressing means includes:
        counting means for counting a clock to generate said write addressing signal; and
        arithmetic means for generating said read addressing signal for rearranging the order of said data from said random order to said correct order using said write addressing signal.

6. A deinterleaver according to claim 5, wherein
    said counting means includes m-bit binary counting means for counting said clock to generate said read addressing signal, wherein m is an integer, and
    said arithmetic means includes:
        bit order reversing means for reversing a bit order of n low-order bits of said count value outputted from said m-bit binary counting means, wherein n is an integer less than m;
        multiplying means for multiplying an output signal of said bit order reversing means by a predetermined multiplication factor;
        dividing means for dividing said count value outputted from said m-bit binary counting means by a predetermined fixed value; and adder means for adding an output signal of said multiplying means to an output signal of said dividing means.

7. A deinterleaver according to claim 6, wherein:

said m-bit binary counting means includes a 9-bit binary counter;

said bit order reversing means reverses a bit order of six low-order bits of said count value outputted from said m-bit binary counting means;

said multiplying means multiplies an output signal of said bit order reversing means by six; and said dividing means divides said count value outputted from said 9-bit binary counting means by 64.

8. A receiving apparatus comprising a deinterleaver according to claim 5, 6 or 7 for receiving data, which are transmitted from a transmitting apparatus and an order of which is rearranged from a correct order to a random order, to rearrange said random order to said correct order.

* * * * *